United States Patent
Oda et al.

(10) Patent No.: US 9,802,505 B2
(45) Date of Patent: Oct. 31, 2017

(54) FUEL CELL VEHICLE AND CONTROL METHOD THEREFOR

(71) Applicant: TOYOTA JIDOSHA KABUSHIKI KAISHA, Toyota-shi, Aichi-ken (JP)

(72) Inventors: Kohei Oda, Toyota (JP); Yuji Kakeno, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 85 days.

(21) Appl. No.: 14/922,774

(22) Filed: Oct. 26, 2015

(65) Prior Publication Data

US 2016/0137095 A1 May 19, 2016

(30) Foreign Application Priority Data

Nov. 13, 2014 (JP) ................................ 2014-230331

(51) Int. Cl.
*B60L 11/18* (2006.01)

(52) U.S. Cl.
CPC .......... *B60L 11/1881* (2013.01); *Y02B 90/12* (2013.01); *Y02T 10/642* (2013.01); *Y02T 10/7005* (2013.01); *Y02T 10/7275* (2013.01)

(58) Field of Classification Search
CPC .. B60L 11/1881; B60L 11/18; B60L 11/1898; Y02B 90/12; Y02T 10/642; Y02T 10/7005; Y02T 10/7275; H01M 2250/20
USPC .............................................. 701/22, 36, 48
See application file for complete search history.

(56) References Cited

U.S. PATENT DOCUMENTS

| 8,381,658 | B1* | 2/2013 | Miller | B61C 7/04 105/26.05 |
| 2002/0163200 | A1* | 11/2002 | Oglesby | B60L 11/1881 290/52 |
| 2005/0197751 | A1* | 9/2005 | Koike | H01M 8/04089 701/22 |
| 2008/0223067 | A1* | 9/2008 | Wu | B60H 1/00392 62/331 |
| 2011/0217608 | A1* | 9/2011 | Matsumoto | H01M 8/04619 429/428 |
| 2014/0081497 | A1* | 3/2014 | Jeon, II | H01M 8/04753 701/22 |
| 2014/0170514 | A1* | 6/2014 | Harris | H01M 8/04223 429/429 |
| 2015/0328984 | A1* | 11/2015 | Haase | B60K 1/04 74/15.82 |

(Continued)

FOREIGN PATENT DOCUMENTS

JP 2011-18485 1/2011

*Primary Examiner* — Bao Long T Nguyen
(74) *Attorney, Agent, or Firm* — Finnegan, Henderson, Farabow, Garrett & Dunner, LLP

(57) ABSTRACT

With a fuel cell vehicle includes a fuel cell and a secondary battery, a drive motor and a pump motor are connected to each other via an electric power line so that the drive motor and the pump motor are capable of receiving and supplying electric power with each other without involving reception and supply of electric power with the secondary battery. The control device determines an upper-limit guard value of torque of the pump motor based on a dischargeable power of the secondary battery and an output power of the fuel cell, or determines a lower-limit guard value of torque of the pump motor based on a chargeable power of the secondary battery and an output power of the fuel cell.

6 Claims, 3 Drawing Sheets

(56) References Cited

U.S. PATENT DOCUMENTS

2016/0049672 A1* 2/2016 Tomita .............. H01M 8/04373
  429/446
2016/0126565 A1* 5/2016 Kwon ............... H01M 8/04029
  429/437
2016/0240904 A1* 8/2016 Hoshi ................. H01M 16/006

* cited by examiner

FUEL CELL VEHICLE AND CONTROL METHOD THEREFOR

CROSS REFERENCE TO RELATED APPLICATIONS

This application claims priority to Japanese Patent Application No. 2014-230331 filed on Nov. 13, 2014, the entire contents of which are incorporated by reference herein.

BACKGROUND

Field

The present invention relates to a fuel cell vehicle and a control method therefor.

Related Art

There are known fuel cell systems for fuel cell vehicles and the like which run with a motor driven by electric energy generated by a fuel cell. In a fuel cell system described in JP2011-18485A, supply of oxygen-containing gas (air) to the fuel cell, where oxygen is one of reactant gases of the fuel cell, is performed by an air compressor (hereinafter, also referred to as 'ACP'). An ACP is driven by an ACP motor which is controlled in rotations in response to electric power supplied from an ACP inverter. For example, an increase in air flow rate of the ACP is fulfilled by controlling the ACP inverter for power running of the ACP motor so that the rotation speed of the ACP motor is increased. Also, a decrease in the air flow rate of the ACP is fulfilled by controlling the ACP inverter for regenerative braking of the ACP motor.

However, permissive power-running power for driving the ACP motor, if an output from fuel cells is excluded, is limited by power (hereinafter, also referred to as 'dischargeable power' or 'battery-dischargeable power') that can be supplied from, a secondary battery provided as a backup of the fuel cell. Therefore, torque of the ACP motor (hereinafter, also referred to as 'ACP torque') is, in general, also limited in its upper-limit value (hereinafter, also referred to as 'upper-limit guard value') in response to the limited value of the battery dischargeable power. Similarly, permissive regenerative power of the ACP motor is also limited by power that can be charged to the secondary battery (hereinafter, also referred to as 'chargeable power' or 'battery-chargeable power'), and moreover a lower-limit value of the ACP torque of the ACP motor (hereinafter, also referred to as 'lower-limit guard value') is also limited. The limitations in these cases mean that the ACP motor cannot be operated (driven) with an ACP torque higher than the upper-limit guard value, and also cannot be operated (regenerated) with an ACP torque lower than the lower-limit guard value. Thus, as an issue involved, the ACP motor cannot be operated in accordance with an instruction of required rotating speed, hence an insufficient responsivity of the ACP motor to instructions of its required rotating speed, i.e., an insufficient ACP responsivity.

For example, in fuel cell vehicles, regenerative braking of a drive motor is basically used as a deceleration mechanism in place of engine breaks in engine-mounted vehicles. Then, in order to obtain larger decelerating power, simply, it can be conceived to employ a mechanism for enhancing a regenerative energy consumption ratio of the drive motor by increasing energy consumption by the ACP, which is done by increasing operations of auxiliary machinery, e.g., rotating speed of the ACP motor. However, there are some cases where the limitation by the upper-limit guard value of the ACP torque as described above makes it impossible to obtain enough increase in energy consumption by the ACP so that enough decelerating power cannot be obtained.

With the accelerator turned off (when a vehicle driver has had a foot off the accelerator pedal), it is desirable that the gas flow rate by the ACP be rapidly lowered to reduce excess oxygen-containing gas within the fuel cells, from the viewpoint of fuel consumption improvement. However, in some cases, due to the limitation by the lower-limit guard value of the ACP torque, it is impossible to fulfill enough regenerative braking of the ACP motor so that enough rapid reduction of the gas flow rate by the ACP cannot be fulfilled.

In addition, in JP2011-18485A, for regenerative braking of the ACP motor, a regenerable power of the ACP motor is calculated based on a power resulting from subtracting the regenerative power of the drive motor from the chargeable power of the secondary battery. Therefore, the regenerable power of the ACP motor can be regarded as being limited, even at most, by the chargeable power of the secondary battery. Thus, with the technique of JP2011-18485A, there is no solution to the above-described issue due to the limitation by the lower-limit guard value of the ACP torque. Furthermore, JP2011-18485A has no description as to the above-described upper-limit guard value of the ACP torque.

SUMMARY

The present invention, having been accomplished to solve at least part of the above-described issues, can be implemented in the following aspects.

(1) According to a first aspect, there is provided a fuel cell vehicle including a fuel cell and a secondary battery, the fuel cell vehicle comprises: a drive motor for driving a load; a pump for supplying an oxygen-containing gas to the fuel cell; a pump motor for driving the pump; and a control device for controlling operations of the drive motor and the pump motor. The drive motor and the pump motor are connected to each other via an electric power line so that the drive motor and the pump motor are capable of receiving and supplying electric power with each other without involving reception and supply of electric power with the secondary battery. The control device determines: (i) an upper-limit guard value of torque of the pump motor based on a dischargeable power of the secondary battery and an output power of the fuel cell; or (ii) a lower-limit guard value of torque of the pump motor based on a chargeable power of the secondary battery and an output power of the fuel cell.

According to the fuel cell vehicle in this aspect, the drive motor and the pump motor are capable of receiving and supplying electric power directly via the electric power line with which they are connected to each other, without involving reception and supply of electric power with the secondary battery. As a result of this, the regenerative power of the drive motor can be utilized as a drive power of the pump motor, or alternatively the regenerative power of the pump motor can be utilized as a drive power of the drive motor. Therefore, the upper-limit guard value or the lower-limit guard value of torque of the pump motor may be changed in response to the operation state of the drive motor. Thus, it is possible to improve the responsivity of the pump motor, i.e. pump responsivity, to instructions as to its required rotating speed.

(2) In the above fuel cell vehicle, the control device may determine the lower-limit guard value of torque of the pump motor based on a drive power of the drive motor in addition to the chargeable power of the secondary battery and the output power of the fuel cell, and with the drive motor in a power running state, the control device may lower the lower-limit guard value of torque of the pump motor as a drive power of the drive motor increases.

According to the fuel cell vehicle in this aspect, as the lower-limit guard value of torque of the pump motor is lowered, the regenerative power of the pump motor will be utilized as a drive power of the drive motor. Thus, reduction of excess oxygen-containing gas supplied to the fuel cell will be accelerated, and fuel consumption by the fuel cell will be improved.

(3) In the above fuel cell vehicle, the control device may determine the upper-limit guard, value of torque of the pump motor based on a regenerative power of the drive motor in addition to the dischargeable power of the secondary battery and the output power of the fuel cell; and with the drive motor in a regeneration state, the control device may raise the upper-limit guard value of torque of the pump motor as a regenerative power of the drive motor increases.

According to the fuel cell vehicle in this aspect, as the upper-limit guard value of torque of the pump motor is raised, the regenerative power of the drive motor will be utilized not only as a charging power for the secondary battery but also as a drive power of the pump motor. Thus, it is possible to enhance the decelerating power of the drive motor.

The present invention may be implemented in various ways, for example, in such various ways as fuel cell systems, fuel cell vehicle control methods, and fuel cell system control methods, in addition to fuel cell vehicles.

DESCRIPTION OF THE EMBODIMENTS

Figure 1:
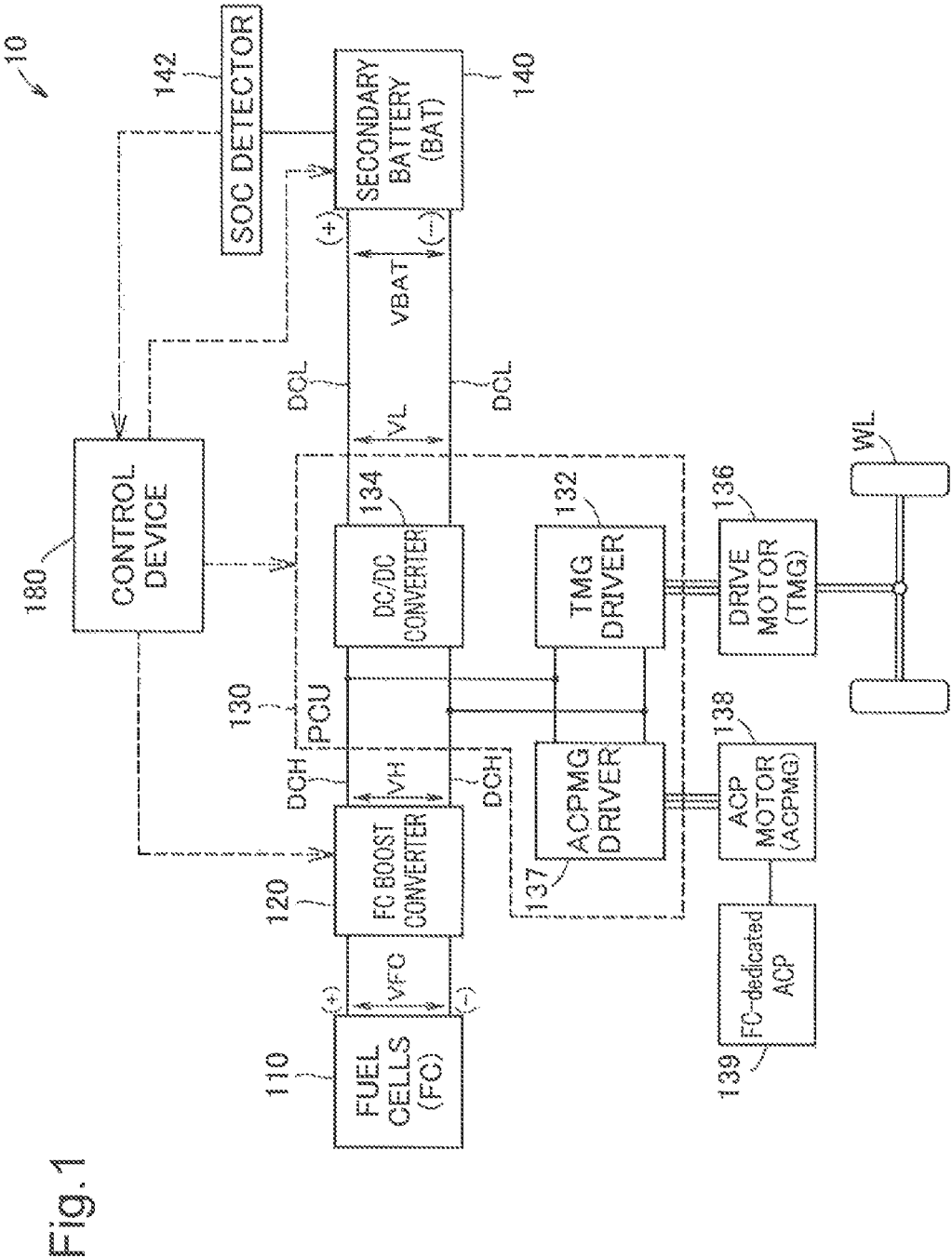
FIG. 1 is a schematic diagram showing a configuration of a fuel cell vehicle as a fuel cell system according to one embodiment of the present invention.

FIG. 1 is a schematic diagram showing a configuration of a fuel cell vehicle 10 as an embodiment of the invention. The fuel cell vehicle 10 is a fuel cell system that runs on rotations of wheels WL effectuated by driving a drive motor 136 with use of, as a drive source, electric power (electric energy) outputted by a fuel cell 110 (also abbreviated as 'FC') and a secondary battery 140 (also abbreviated as 'BAT').

The fuel cell vehicle 10 includes the fuel cell 110, an FC boost converter 120, a power control unit 130, a drive motor 136, an air compressor motor 138, an air compressor 139, the secondary battery 140, an SOC detector 142, and a control device 180. The power control unit is abbreviated as 'PCU', and similarly the drive motor is abbreviated as 'TMG', the air compressor as 'ACP', and the ACP motor as 'ACPMG', respectively.

The fuel cell vehicle 10 is further equipped with a supply system and a discharge system for reactant gases, and a refrigerant supply system as equipment for power generation of the fuel cell 110, as well as various mechanisms and the like as a vehicle, but depiction and description of those members are omitted. However, out of various types of equipment such as pumps and motors (also referred to as 'auxiliary machinery') contained in the reactant-gas supply system and discharge section and the refrigerant supply system, the oxidizing-gas ACP 139 (also referred to as 'FC-dedicated ACP 139') and the ACP motor 138, which are related to later-described control, are shown in FIG. 1.

The fuel cell 110 is a polymer electrolyte fuel cell which receives supply of hydrogen as a fuel gas and air as an oxidizing gas (specifically, oxygen contained in air as an oxygen-containing gas) to generate electric power. The secondary battery 140 may be implemented by a lithium ion battery as an example. It should be noted that the fuel cell 110 and the secondary battery 140 are not limited to the polymer electrolyte fuel cell and the lithium ion battery, respectively, and may be provided by adopting other various types of fuel cells and chargeable/dischargeable batteries.

The control device 180 is formed of a microcomputer including a CPU, ROM, RAM and the like. The control device 180 accepts switching operations via an operation mode changeover switch (not shown) by the driver to change over an operation mode of the fuel cell vehicle 10. In this case, the fuel cell vehicle 10 of this embodiment has a 'normal running mode' as a driving mode.

The 'normal running mode' refers to a mode for keeping the fuel cell vehicle 10 running based on operations by a driver. With the normal running mode selected, the control device 180 accepts operations such as an accelerator operation by the driver to control the power generation of the fuel cell 110 and the charging/discharging of the secondary battery 140 in response to the content of the operation.

The fuel cell 110 is connected to a high-voltage DC line DCH via the FC boost converter 120, and further connected to a TMG driver 132 and an ACPMG driver 137 contained in the PCU 130 via the high-voltage DC line DCH. The secondary battery 140 is connected to a DC/DC converter 134 contained in the PCU 130 via a low-voltage DC line BCL, and the DC/DC converter 134 is connected to the high-voltage DC line DCH.

The FC boost converter 120 boosts an output voltage VFC of the fuel cell 110 to a high voltage VH usable for the TMG driver 132 and the ACPMG driver 137.

The TMG driver 132 is connected via a gear or the like to the drive motor (TMG) 136 that drives the wheels WL. The drive motor 136 is formed of a synchronous motor having three-phase coils. The TMG driver 132, which is formed of a three-phase inverter circuit, supplies the drive motor 136 with three-phase AC power resulting from the TMG driver 132's conversion of the output power of the fuel cell 110 supplied via the FC boost converter 120 and the output power of the secondary battery 140 supplied via the DC/DC converter 134. The drive motor 136 drives the wheels WL with a torque responsive to the supplied power, and the wheels WL are rotated along with rotations of the drive motor 136.

The ACPMG driver 137 is connected to the ACP motor (ACPMG) 138 that drives the ACP 139. The ACP motor 138, like the drive motor 136, is formed of a synchronous motor having three-phase coils. The ACPMG driver 137, like the TMG driver 132, is formed of a three-phase inverter circuit, and supplies the ACP motor 138 with three-phase AC power resulting from the ACPMG driver 137's conversion of the output power of the fuel cell 110 supplied via the FC boost converter 120 and the output power of the secondary battery 140 supplied via the DC/DC converter 134. The ACP motor 138 drives the ACP 139 with a torque responsive to the supplied power, and the ACP 139 supplies air to the fuel cell 110 in response to rotations of the ACP motor 138.

Further, the TMG driver 132 is capable of delivering regenerative power (regenerative energy), which is derived from regenerative braking of the drive motor 136, to the high-voltage DC line DCH, and the ACPMG driver 137 is capable of delivering regenerative power (regenerative energy), which is derived from regenerative braking of the ACP motor 138, to the high-voltage DC line DCH. Therefore, the drive motor 136 may be driven (operated for power running) upon supply of the regenerative power by the ACP motor 138, and the ACP motor 138 may be driven (operated for power running) upon supply of the regenerative power by the drive motor 136.

The drive motor 136 and the ACP motor 138 are connected to each other via an electric power line so that they receive and supply electric power with each other without involving reception and supply of electric power with the secondary battery 140. The TMG driver 132 is also referred to as 'drive motor driving circuit.' Also, the ACP 139 and the ACP motor 138 are also referred to as 'pump' and 'pump motor,' respectively, and the ACPMG driver 137 is also referred to as 'pump driving circuit.' The high-voltage DC line DCH corresponds to an 'electric power line for connecting the drive motor driving circuit and the pump driving circuit to each other.'

In the normal running mode, the control device 180 generates and transmits a drive signal responsive to an accelerator opening degree (step-in amount of the accelerator pedal) to each of the TMG driver 132, the DC/DC converter 134 and the ACPMG driver 137. In response to the drive signal of the control device 180, the TMG driver 132 and the ACPMG driver 137 perform pulse width adjustment of AC voltage or the like so as to make the drive motor 136 and the ACP motor 138 execute rotational drive responsive to the accelerator opening degree. As a result, running of the fuel cell vehicle 10 is carried out.

The DC/DC converter 134 variably adjusts the voltage level of the high-voltage DC line DCH responsive to the drive signal from the control device 180 to change over between charging and discharging state of the secondary battery 140. The DC/DC converter 134, with the secondary battery 140 in the state of discharging, converts an output voltage VBAT of the secondary battery into a high voltage VH usable for the TMG driver 132 and the ACPMG driver 137. With the secondary battery 140 in the state of charging, the DC/DC converter 134 converts a high voltage VH outputted from the FC boost converter 120 into a low voltage VL chargeable for the secondary battery 140. In addition, when regenerative power is generated in the drive motor 136, the regenerative power is converted into DC power by the TMG driver 132 and then, as described later, supplied to the ACP motor 138 or supplied to the secondary battery 140 via the DC/DC converter 134. Also, when regenerative power is generated in the ACP motor 138, the regenerative power is converted into DC power by the ACPMG driver 137 and then, as described later, supplied to the drive motor 138 or supplied to the secondary battery 140 via the DC/DC converter 134.

The SOC detector 142 detects a state of charge (SOC) of the secondary battery 140 and transmits the state to the control device 180. In addition, the term 'state of charge (SOC)' herein refers to a ratio of currently remaining charge level (stored charge quantity) to a full charge capacity of the secondary battery 140. The SOC detector 142 detects a temperature, an output voltage and an output current of the secondary battery 140 to detect an SOC based on those detected values.

The control device 180 acquires an SOC detected by the SOC detector 142 and, based on the acquired SOC, controls charging/discharging of the secondary battery 140 so that the SOC of the secondary battery 140 falls within a specified range.

Figure 2:
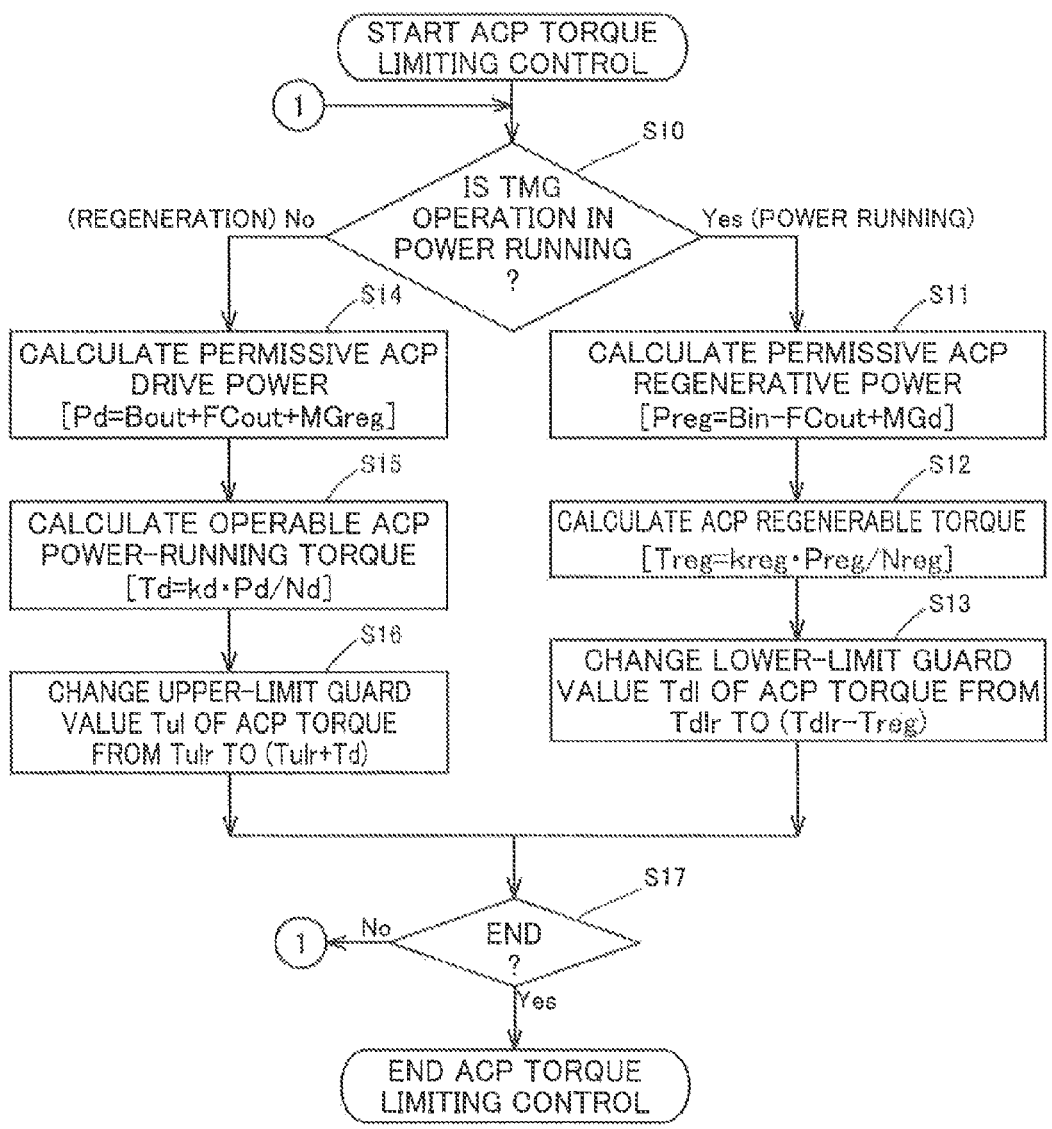
FIG. 2 is a flowchart showing control, for limited values of ACP torque of the ACP motor to be executed by a control device.

FIG. 2 is a flowchart showing control for limit values of the torque of the ACP motor 138 (also referred to as 'ACP torque') to be executed by the control device 180. This ACP torque limiting control is started when an unshown starter switch is turned on to instruct a start-up of the fuel cell system.

At step S10, it is decided whether the drive motor (TMG) 136 is in a power running operation state or in a regenerative operation state. If it is in the power running operation state, then processes of steps S11 to S13 are executed. If it is in the regenerative operation state, then processes of steps S14 to S16 are executed.

In the case of the power running operation state, first at step S11, an regenerative power Preg permissible for the ACP motor 138 (also referred to as 'permissible ACP regenerative power') is calculated according to the following Equation (1):

$$Preg = Bin \cdot FCout + MGd \quad (1)$$

where Bin is a chargeable power of the secondary battery 140, FCout is an output power of the fuel cell 110, and MGd is a drive power (power consumption) of the drive motor 136. The third term (MGd) in the right-hand side of Equation (1) may be omitted.

Next, at step S12, an ACP torque (also referred to as 'ACP regenerable torque') Treg of the ACP motor 138 that will make the permissible AGP regenerative power Preg is calculated according to the following Equation (2):

$$Treg = Kreg \cdot Preg / Nreg \quad (2)$$

where Kreg is a constant, and Nreg is a regenerative rotating speed (in this case, rotating speed of the ACP motor 138 at a time of calculation of the permissible ACP regenerative power).

Then, at step S13, a lower-side limit value (also referred to as 'lower-limit guard value') Tdl of the ACP torque that can be set for the ACP motor 138 is changed to a value (Tdlr−Treg) that is lower than a lower-limit reference value Tdlr by an ACP torque Treg. On the other hand, an upper-side limit value (also referred to as 'upper-limit guard value') Tul is maintained as it remains to be a later-described upper-limit reference value Tulr. It should be noted that the lower-limit reference value Tdlr is an ACP regenerable torque corresponding to a regenerative power equal to a value resulting from excluding the output power FCout of the fuel cell 110 and the drive power MGd of the drive motor 136 from the right-band side of Equation (1), i.e., equal to the chargeable power Bin of the secondary battery 140.

In contrast, if it is decided to be in the regenerative operation state at step S10, first at step S14, a drive power (also referred to as 'permissive ACP drive power') Pd permissible for the ACP motor 138 is calculated according to the following Equation (3):

$$Pd = Bout + FCout + MGreg \quad (3)$$

where Bout is a dischargeable power of the secondary battery 140, FCout is an output power of the fuel cell 110, and MGreg is a regenerative power of the drive motor 136. The third term (MGreg) in the right-hand side of Equation (3) may be omitted.

Next, at step S15, an ACP torque (also referred to as 'ACP power-running operable torque') Td of the ACP motor 138 operable for power running with the permissive ACP drive power Pd is calculated according to the following Equation (4).

$$Td = Kd \cdot Pd/Nd \qquad (4)$$

where Kd is a constant, and Nd is a drive rotating speed (rotating speed of the ACP motor 138 at a time of calculation, of the permissive ACP drive power Pd).

Then, at step S16, the upper-limit guard value Tul of the ACP torque that can be set for the ACP motor 138 is changed to a value (Tulr+Td) that is higher than the upper-limit reference value Tulr by the ACP power-running operable torque Td, while the lower-limit guard value Tdl is maintained as it remains the above-described lower-limit reference value Tdlr. It should be noted that the upper-limit reference value Tulr is an ACP power-running operable torque corresponding to a drive power equal to a value resulting from excluding the output power FCout of the fuel cell 110 and the regenerative power MGreg of the drive motor 136 from the right-hand side of Equation (3), i.e., equal to a dischargeable power Bout of the secondary battery 140.

The processing of steps S11 to S13 and the processing of steps S14 to S16 are repeatedly executed until the unshown starter switch is turned off to instruct a stop of the fuel cell system so that an end of the ACP torque limiting control process is instructed (step S17).

Executing the above-described ACP torque limiting control process makes it possible to obtain effects described below.

Figure 3:
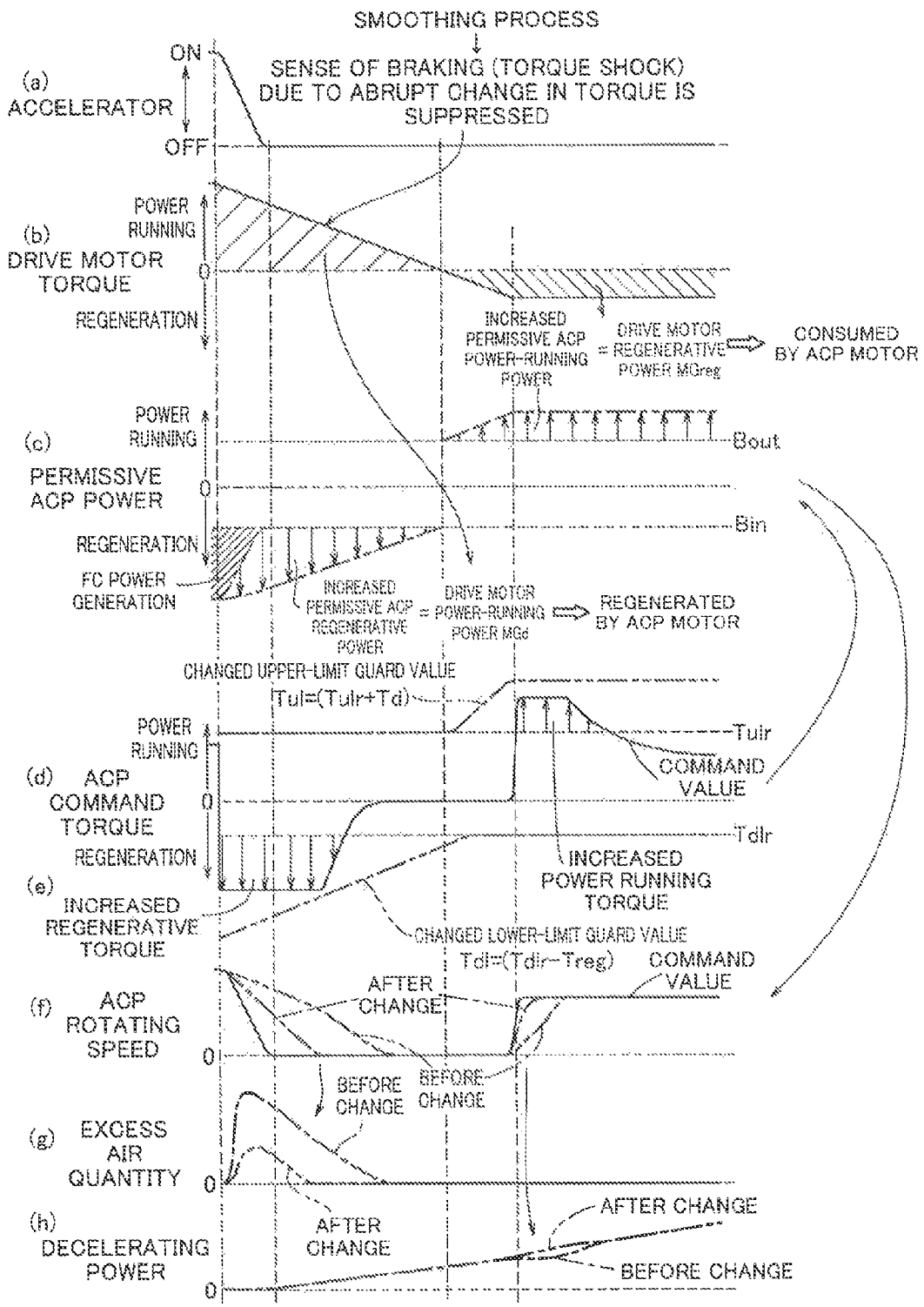
FIG. 3 is an explanatory view showing effects of changes in the upper-limit guard value and the lower-limit guard value of the ACP torque upon a turn-off of the accelerator.

FIG. 3 is an explanatory view showing effects of changes in the upper-limit guard value and the lower-limit guard value of the ACP torque upon a turn-off of the accelerator. As shown in FIG. 3(a), upon a transition of the accelerator from on (stepped-in state) to off (non-stepped-in state) state, if the torque of the drive motor 136 is set to zero abruptly accordingly, the driver or occupants would be given a sense of braking (torque shock) due to the abrupt change in torque. Thus, for avoidance of this, the power running torque of the drive motor 136 is gradually decreased by a smoothing process as shown in FIG. 3(b).

While the drive motor 136 is going on power running operation by the smoothing process, the permissible ACP regenerative power Preg will be increased in response to a drive power (power-running power) MGd of the drive motor 136 as shown in FIG. 3(c). Then, in response to the increased permissible ACP regenerative power Preg, as shown in FIG. 3(d), the lower-limit guard value Tdl of the ACP command torque will be changed to a value (Tdlr−Treg) that is lower than the lower-limit reference value Tdlr by the ACP regenerable torque Treg (see steps S11 to S13 in FIG. 2). As a result, it becomes possible to instruct an increased regenerative torque (a negative torque having a larger absolute value) for the ACP motor 138. Thus, as shown in FIG. 3(e), the ACP motor 138 may be improved in responsivity, as compared to when the lower-limit guard value Tdl of the ACP command torque is not changed, so that the ACP motor 138 will be lowered in rotating speed earlier. Consequently, since the responsivity of the ACP 139 will be improved so that a rapid lowering of the air flow rate by the ACP 139 will be implemented, it is possible to earlier reduce the quantity of excess air supplied to the fuel cell 110, as shown in FIGS. 3(f) and 3(g).

After the drive motor 136 has changed over from power running operation to regenerative operation, the permissive ACP power-running power Pd will be increased in response to the regenerative power MGreg of the drive motor 136, as shown in FIG. 3(c). Then, in response to the increased permissive ACP power-running power Pd, the upper-limit guard value Tul of the ACP command torque will be changed to a value (Tulr+Td) that is higher than the upper-limit reference value Tulr by the ACP power-running operable torque Td as shown in FIG. 3(d) (see steps S14 to S16 in FIG. 2). As a result, it becomes possible to command an increased power running torque (a positive torque) for the ACP motor 138. Thus, as shown in FIG. 3(e), the ACP motor 138 will be improved in responsivity, as compared to when the upper-limit guard value Tul of the ACP command torque is not changed, so that the ACP motor 138 will be increased in rotating speed earlier. Consequently, since the drive power (power consumption) of the ACP motor 138 will be increased earlier so that the consumption rate of the regenerative power of the drive motor 136 will be enhanced, it is possible to enhance the decelerating power of the fuel cell vehicle 10, as shown in FIG. 3(h).

In the ACP torque limiting control shown in FIG. 2, simply, the processing of steps S11 to S13 is executed when the drive motor 136 is in the power running operation state, while the processing of steps S14 to S16 is executed when the drive motor 136 is in the regenerative operation state. Alternatively, for example, upon a change of the accelerator to an off state, i.e., upon a transition from a presence-of-drive-request state, in which a drive request from the operator (instructor) to the drive motor 136 is present, to an absence-of-drive-request state, in which such a request is absent, it may follow that the processing of steps S11 to S13 is executed when the actual operation state of the drive motor 136 is a power running state, and the processing of steps S14 to S16 is executed when the actual operation state is a regeneration state. Further, as one aspect of the invention, the ACP torque limiting control shown in FIG. 2 may be modified such that only the processing of steps S11 to S13 for changing the lower-limit guard value of the ACP torque is executed while the steps S14 to S16 are not executed. As another aspect of the invention, it is also allowable that only the processing of steps S14 to S16 for changing the upper-limit guard value of the ACP torque is executed while the steps S11 to S13 are not executed.

The foregoing embodiment has been described by way of example on a fuel cell vehicle utilizing the fuel cell system. However, without being limited to this, the invention may also be applied to various types of fuel cell systems which include fuel cells and a secondary battery as a backup of the fuel cells and in which a drive motor is driven by electric energy generated by the fuel cells. Also, in the above-described embodiment, part or entirety of the functions and the processes implemented by software may be implemented by hardware. Furthermore, part or entirety of the functions and the processes implemented by hardware may be implemented by software. The hardware may be exemplified by use of various circuitry such as integrated circuits, discrete circuits, circuit modules in combination among those circuits, or the like.

The present invention is not limited to the above-described embodiments, working examples and modifications and can be realized by various types of configurations without departing from the spirit thereof. For example, technical features in the embodiments, working examples and modifications corresponding to technical features in the individual aspects described in the section of Summary may be replaced or combined with one another, as required, in order to solve part or entirety of the above-described problems or to achieve part or entirety of the above-described advantageous effects. Moreover, those technical features may be deleted, as required, unless herein otherwise described as indispensable.

What is claimed is:

1. A fuel cell vehicle including a fuel cell and a secondary battery, the fuel cell vehicle comprising:
    a drive motor for driving a load;
    a pump for supplying an oxygen-containing gas to the fuel cell;
    a pump motor for driving the pump; and
    a control device for controlling operations of the drive motor and the pump motor, wherein
    the drive motor and the pump motor are connected to each other via an electric power line so that the drive motor and the pump motor are configured to receive and supply electric power with each other without involving reception and supply of electric power with the secondary battery, and wherein
    the control device determines:
    (i) an upper-limit guard value of torque of the pump motor based on a dischargeable power of the secondary battery and an output power of the fuel cell; or
    (ii) a lower-limit guard value of torque of the pump motor based on a chargeable power of the secondary battery and an output power of the fuel cell.

2. The fuel cell vehicle in accordance with claim 1, wherein
    the control device determines the lower-limit guard value of torque of the pump motor based on a drive power of the drive motor in addition to the chargeable power of the secondary battery and the output power of the fuel cell, and
    with the drive motor in a power running state, the control device lowers the lower-limit guard value of torque of the pump motor as the drive power of the drive motor increases.

3. The fuel cell vehicle in accordance with claim 1, wherein
    the control device determines the upper-limit guard value of torque of the pump motor based on a regenerative power of the drive motor in addition to the dischargeable power of the secondary battery and the output power of the fuel cell; and
    with the drive motor in a regeneration state, the control device raises the upper-limit guard value of torque of the pump motor as the regenerative power of the drive motor increases.

4. A control method for a fuel cell vehicle including a fuel cell, a secondary battery, a pump for supplying an oxygen-containing gas to the fuel cell, and a drive motor and a pump motor which are connected to each other via an electric power line so that the drive motor and the pump motor are configured to receive and supply electric power with each other without involving reception and supply of electric power with the secondary battery, the control method comprising the steps of:
    (i) determining an upper-limit guard value of torque of the pump motor based on a dischargeable power of the secondary battery and an output power of the fuel cell, or
    (ii) determining a lower-limit guard value of torque of the pump motor based on a chargeable power of the secondary battery and an output power of the fuel cell; and
    controlling the pump motor in response to the upper-limit guard value determined by the step (i) or the lower-limit guard value determined by the step (ii).

5. The control method in accordance with claim 4, wherein
    the lower-limit guard value of torque of the pump motor is determined based on a drive power of the drive motor in addition to the chargeable power of the secondary battery and the output power of the fuel cell, and
    with the drive motor in a power running state, the lower-limit guard value of torque of the pump motor is set lower as the drive power of the drive motor Increases.

6. The control method in accordance with claim 4, wherein
    the upper-limit guard value of torque of the pump motor is determined based on a regenerative power of the drive motor in addition to the dischargeable power of the secondary battery and the output power of the fuel cell; and
    with the drive motor in a regeneration state, the upper-limit guard value of torque of the pump motor is set higher as the regenerative power of the drive motor increases.

* * * * *